(12) United States Patent
Soeda et al.

(10) Patent No.: US 7,213,676 B2
(45) Date of Patent: May 8, 2007

(54) POWER STEERING SYSTEM

(75) Inventors: Jun Soeda, Kanagawa (JP); Tadaharu Yokota, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/073,528

(22) Filed: Mar. 8, 2005

(65) Prior Publication Data
US 2005/0236220 A1    Oct. 27, 2005

(30) Foreign Application Priority Data
Mar. 8, 2004    (JP)    ............... 2004-063289

(51) Int. Cl.
*B62D 5/06* (2006.01)
(52) U.S. Cl. ............ 180/417; 180/421; 180/422; 180/405; 180/403
(58) Field of Classification Search ......... 180/417, 180/421, 422, 405, 403
See application file for complete search history.

(56) References Cited

U.S. PATENT DOCUMENTS

| | | | |
|---|---|---|---|
| 5,497,692 A * | 3/1996 | Marcott | 91/523 |
| 6,520,520 B2 * | 2/2003 | Howard | 280/90 |
| 6,611,415 B1 * | 8/2003 | Hagidaira et al. | 361/160 |
| 6,981,568 B2 * | 1/2006 | Kang | 180/423 |
| 2003/0070863 A1 * | 4/2003 | Carlstedt et al. | 180/417 |

FOREIGN PATENT DOCUMENTS

| | | | |
|---|---|---|---|
| JP | 2002-145087 A | | 5/2002 |
| JP | 2002145087 | * | 5/2002 |

* cited by examiner

*Primary Examiner*—Lesley D. Morris
*Assistant Examiner*—Marlon Arce-Diaz
(74) *Attorney, Agent, or Firm*—Sughrue Mion, PLLC

(57) ABSTRACT

In a power steering system employing a power cylinder for steering assistance, hydraulic pressure is supplied through a pair of fluid lines to respective hydraulic chambers of the power cylinder. Check valves are provided to charge a hydraulic pressure in a communicating circuit intercommunicating the two fluid lines. Also provided is a solenoid-actuated directional control valve for relieving the hydraulic pressure charged in presence of a power steering system failure. An opening of the directional control valve varies depending on a solenoid attracting force and a pressure differential between the hydraulic pressure in the communicating circuit and hydraulic pressure in a reservoir. A relatively low exciting current is applied to the solenoid when the hydraulic pressure charged exceeds a predetermined pressure value. A relatively high exciting current is applied to the solenoid when the hydraulic pressure charged is less than or equal to the predetermined pressure value.

23 Claims, 4 Drawing Sheets

POWER STEERING SYSTEM

TECHNICAL FIELD

The present invention relates to a power steering system for automotive vehicles, and specifically to a hydraulic power steering system with a motor-driven reversible pump and a hydraulic power cylinder accommodating therein a piston so that a steering assistance force is produced by directing working fluid flow from the pump to one or the other end of the piston when a steering wheel is turned.

BACKGROUND ART

In recent years, there have been proposed and developed various electronically-controlled power steering systems each employing a reversible pump and a hydraulic power cylinder to provide steering assistance. One such hydraulic power steering system has been disclosed in Japanese Patent Provisional Publication No. 2002-145087 (hereinafter is referred to as "JP2002-145087"), assigned to the assignee of the present invention. In the hydraulic power steering system disclosed in JP2002-145087, downstream ends of a pair of hydraulic-pressure lines are respectively connected to left and right pressure chambers defined on both sides of a piston slidably accommodated in a hydraulic power cylinder. On the other hand, the upstream ends of the two hydraulic-pressure lines are connected to respective discharge ports of a reversible pump. The resulting pressure differential applied to the two sides of the piston, produces a steering assistance force. The magnitude and sense of the steering assistance force are determined based on the magnitude and sense of the steering torque applied to a steering wheel by the driver. Also provided is a communication passage or a bypass passage through which the two hydraulic-pressure lines, that is, the left and right pressure chambers, are intercommunicated with each other, when at least one of the reversible pump and the motor both incorporated in the power steering system is failed. A directional control valve (a shut-off valve), such as a two-position, spring-offset, two-way spool valve, is disposed in the communication passage, to block fluid communication between the two hydraulic-pressure lines via the communication passage during normal steering operation. On the contrary, in presence of a power steering system failure, such as a reversible pump failure or a motor failure, the directional control valve is shifted to its open position for fail-safe purposes, so as to permit full fluid-communication between the two hydraulic-pressure lines via the communication passage so that the power cylinder is held in the free state and does not produce an assisting force, and that a manual steering mode is ensured.

However, the power steering system disclosed in JP2002-145087 uses a normally-open, solenoid-actuated two-port two-position spring-offset spool valve as a directional control valve. Thus, in the system of JP2002-145087, an exciting current must be continuously applied to the solenoid of the directional control valve during a normal power steering mode (or a normal power-assist control mode) where the power steering system is normally operating with no power steering system failure. Continuously energizing the solenoid of the directional control valve during the normal power-assist control mode results in increased electric power consumption and increased calorific value of heat generated. From the viewpoint of improved fuel economy of a power-steering-system equipped vehicle, during the normal power-assist control mode the more reduced electric power consumption (more reduced calorific value of heat generated from the solenoid) would be desirable.

SUMMARY OF THE INVENTION

Accordingly, it is an object of the invention to provide an improved hydraulic power steering system with a solenoid-actuated directional control valve, capable of effectively suppressing and reducing electric power consumption during a normal power-assist control mode.

In order to accomplish the aforementioned and other objects of the present invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, a torque sensor that detects a steering torque applied to the steering mechanism, a motor that drives the pump, a motor control circuit that controls the motor responsively to a command signal determined based on the steering torque detected, a reservoir storing working fluid, a first communicating line intercommunicating the first fluid line and the reservoir, a second communicating line intercommunicating the second fluid line and the reservoir, a first one-way directional control valve disposed in the first communicating line for permitting only a working-fluid flow from the first fluid line to the reservoir, a second one-way directional control valve disposed in the second communicating line for permitting only a working-fluid flow from the second fluid line to the reservoir, a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves irrespective of the solenoid energized state or the solenoid de-energized state when a pressure differential between a hydraulic pressure in the communicating line between either one of the first and second one-way directional control valves and the solenoid-actuated directional control valve and a hydraulic pressure in the reservoir is greater than or equal to a predetermined value, and a solenoid-actuated directional control valve control circuit that establishes fluid communication between the reservoir and each of the first and second one-way directional control valves by opening the directional control valve in presence of a hydraulic power steering system failure including at least one of a motor failure and a reversible pump failure, the solenoid-actuated directional control valve control circuit applying a relatively low exciting current to a solenoid of the directional control valve when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

According to another aspect of the invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, a motor that drives the pump, a motor control circuit that controls the motor, a reservoir storing working fluid, a first communicating line intercommunicating the first fluid line and the reservoir, a second communicating line intercommunicating the second fluid line and the reservoir, a first one-way directional control valve disposed in the first communicating line for permitting only a working-fluid flow from the first fluid line to the reservoir, a second one-way directional control valve disposed in the second communicating line for permitting only a working-fluid flow from the second fluid line to the reservoir, a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves when a pressure differential between a hydraulic pressure in the communicating line between either one of the first and second one-way directional control valves and the solenoid-actuated directional control valve and a hydraulic pressure in the reservoir is greater than or equal to a predetermined value, and a solenoid-actuated directional control valve control circuit that establishes fluid communication between the reservoir and each of the first and second one-way directional control valves by opening the directional control valve in presence of a hydraulic power steering system failure including at least one of a motor failure and a reversible pump failure, the solenoid-actuated directional control valve control circuit applying a relatively low exciting current to a solenoid of the directional control valve when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

According to a further aspect of the invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, a motor that drives the pump, a motor control circuit that controls the motor, a reservoir storing working fluid, a first communicating line intercommunicating the first fluid line and the reservoir, a second communicating line intercommunicating the second fluid line and the reservoir, a first one-way directional control valve disposed in the first communicating line for permitting only a working-fluid flow from the first fluid line to the reservoir, a second one-way directional control valve disposed in the second communicating line for permitting only a working-fluid flow from the second fluid line to the reservoir, a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves when a pressure differential between a hydraulic pressure in the communicating line between either one of the first and second one-way directional control valves and the solenoid-actuated directional control valve and a hydraulic pressure in the reservoir is greater than or equal to a predetermined value, and a solenoid-actuated directional control valve control circuit that de-energizes a solenoid of the directional control valve in presence of a hydraulic power steering system failure including at least one of a motor failure and a reversible pump failure, the solenoid-actuated directional control valve control circuit applying a relatively low exciting current to the solenoid when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

According to a still further aspect of the invention, a hydraulic power steering system comprises a steering mechanism adapted to be connected to steered road wheels, a hydraulic power cylinder accommodating therein a piston connected to the steering mechanism for steering assistance, and having first and second hydraulic chambers defined on both sides of the piston, a reversible pump having a pair of discharge ports, a first fluid line intercommunicating the first hydraulic chamber and a first one of the discharge ports of the pump, a second fluid line intercommunicating the second hydraulic chamber and the second discharge port, sensor means for detecting a steering torque applied to the steering mechanism, a motor that drives the pump, motor control means for controlling the motor responsively to a command signal determined based on the steering torque detected, a reservoir storing working fluid, a first communicating line intercommunicating the first fluid line and the reservoir, a second communicating line intercommunicating the second fluid line and the reservoir, a first one-way directional control valve disposed in the first communicating line for permitting only a working-fluid flow from the first fluid line to the reservoir, a second one-way directional control valve disposed in the second communicating line for permitting only a working-fluid flow from the second fluid line to the reservoir, solenoid-actuated directional control valve means, which is disposed between the first one-way directional control valve and the reservoir and between the second one-way directional control valve and the reservoir for blocking fluid communication between the reservoir and each of the first and second one-way directional control valves in a solenoid energized state and for establishing fluid communication between the reservoir and each of the first and second one-way directional control valves in a solenoid de-energized state, and whose valve opening varies based on a solenoid attracting force created by a solenoid of the directional control valve means and a pressure differential between a hydraulic pressure in the communicating line between either one of the first and second one-way directional control valves and the solenoid-actuated directional control valve and a hydraulic pressure in the reservoir, said solenoid-actuated directional control valve means blocking fluid communication between the reservoir and each of the first and second one-way directional control valves irrespective of the solenoid energized state or the solenoid de-energized state when the pressure differential is greater than or equal to a predetermined value, and valve control means electrically connected to the solenoid-actuated directional control valve means for establishing fluid communication between the reservoir and each of the first and second one-way directional control valves by opening the directional control valve means in presence of a hydraulic power steering system failure including at least one of a motor failure and a reversible pump failure, and for blocking fluid communication between the reservoir and each of the first and second one-way directional control valves by closing the directional control valve means in absence of the hydraulic power steering system failure, the valve control means applying a relatively low exciting current to the solenoid for holding the directional control valve means at a predetermined closed position when the hydraulic pressure in the communicating line exceeds a predetermined pressure value, and the valve control means applying a relatively high exciting current having a higher current value than the relatively low exciting current to the solenoid for holding the directional control valve means at the predetermined closed position when the hydraulic pressure in the communicating line is less than or equal to the predetermined pressure value.

According to another aspect of the invention, a method for controlling a hydraulic power steering system, wherein the hydraulic power steering system includes a hydraulic power cylinder accommodating therein a piston connected to a steering mechanism for steering assistance and having first and second hydraulic chambers defined on both sides of the piston, a reversible pump driven by a motor, a first fluid line intercommunicating the first hydraulic chamber and a first one of two discharge ports of the pump, a second fluid line intercommunicating the second hydraulic chamber and the second discharge port, a torque sensor that detects a steering torque applied to the steering mechanism, a reservoir, a first communicating line intercommunicating the first fluid line and the reservoir, a second communicating line intercommunicating the second fluid line and the reservoir, a first one-way check valve disposed in the first communicating line for permitting only a working-fluid flow from the first fluid line to the reservoir, a second one-way check valve disposed in the second communicating line for permitting only a working-fluid flow from the second fluid line to the reservoir, a solenoid-actuated directional control valve whose opening varies based on a solenoid attracting force created by a solenoid of the directional control valve and a pressure differential between a hydraulic pressure in the communicating line between either one of the first and second one-way check valves and the solenoid-actuated directional control valve and a hydraulic pressure in the reservoir and which is disposed between the first one-way check valve and the reservoir and between the second one-way check valve and the reservoir, and an electronic control unit configured to be electronically connected to the torque sensor, the motor and the solenoid-actuated directional control valve, for automatically controlling a state of steering assistance and for fail-safe purposes of the hydraulic power steering system, the method comprises controlling the motor responsively to a command signal determined based on the steering torque detected, blocking fluid communication between the reservoir and each of the first and second one-way check valves by closing the solenoid-actuated directional control valve in a solenoid energized state during a normal power-assist control mode, establishing fluid communication between the reservoir and each of the first and second one-way check valves by opening the solenoid-actuated directional control valve in a solenoid de-energized state during a manual steering mode, blocking fluid communication between the reservoir and each of the first and second one-way check valves by closing the solenoid-actuated directional control valve irrespective of the solenoid energized state or the solenoid de-energized state when a pressure differential between a hydraulic pressure in the communicating line between either one of the first and second one-way check valves and the solenoid-actuated directional control valve and a hydraulic pressure in the reservoir is greater than or equal to a predetermined value, establishing fluid communication between the reservoir and each of the first and second one-way check valves by opening the directional control valve to initiate the manual steering mode in presence of a hydraulic power steering system failure including at least one of a motor failure and a reversible pump failure, applying a relatively low exciting current to the solenoid for holding the directional control valve at a predetermined closed position when the hydraulic pressure in the communicating line exceeds a predetermined pressure value during the normal power-assist control mode, and applying a relatively high exciting current having a higher current value than the relatively low exciting current to the solenoid for holding the directional control valve at the predetermined closed position when the hydraulic pressure in the communicating line is less than or equal to the predetermined pressure value during the normal power-assist control mode.

The other objects and features of this invention will become understood from the following description with reference to the accompanying drawings.

DESCRIPTION OF THE PREFERRED EMBODIMENTS

Figure 1:
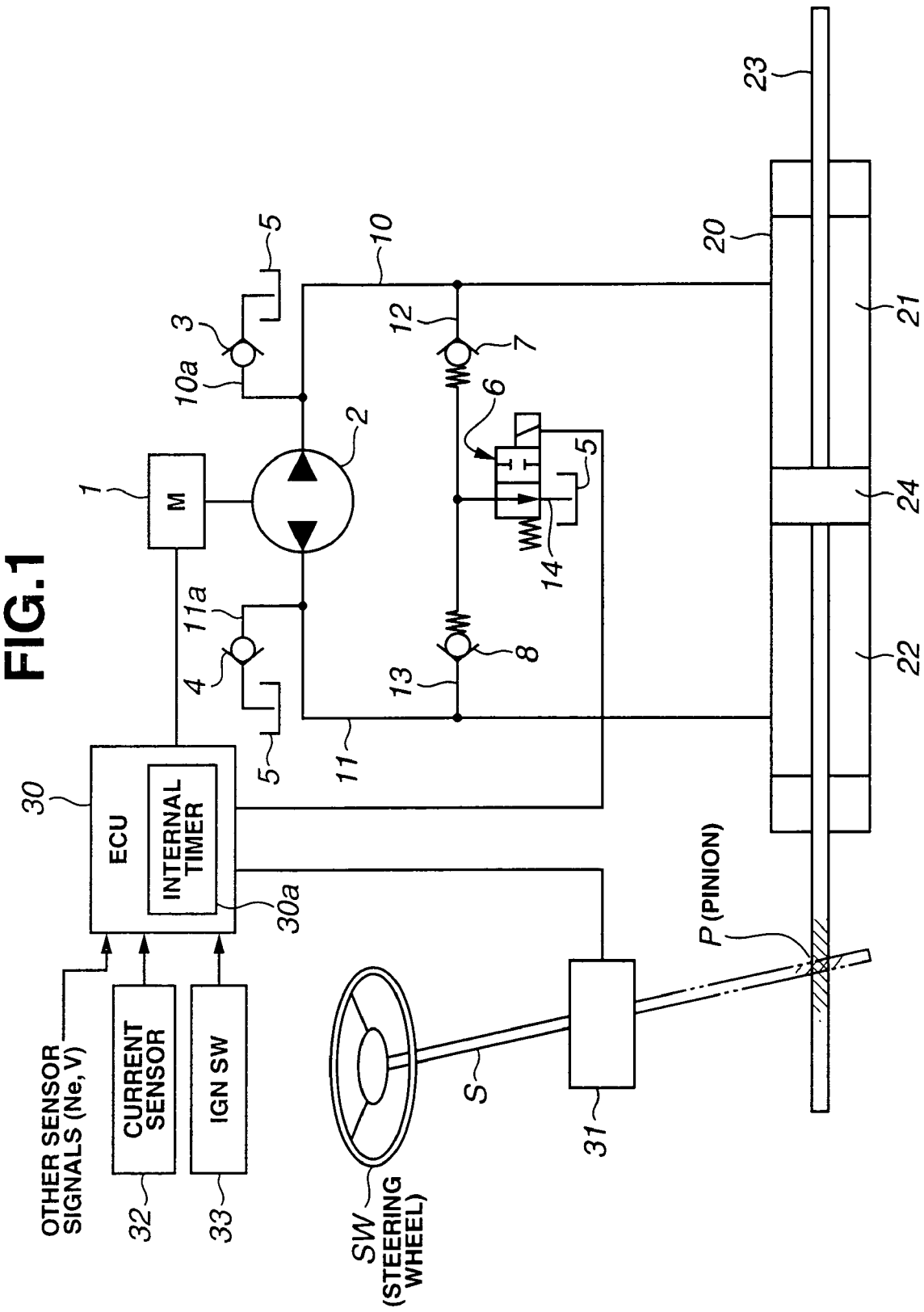
FIG. 1 is a system block diagram illustrating an embodiment of a power steering system.

Referring now to the drawings, particularly to FIG. 1, the power steering system of the embodiment is exemplified in an electronically-controlled hydraulic power steering system with a hydraulic power cylinder 20 and a reversible pump 2. As can be seen from the system diagram of FIG. 1, when a steering wheel SW is turned by the driver, rotary motion of a pinion P, formed on the lower end of a steering shaft S, is converted into straight-line motion (linear motion) of a rack shaft 23, thus causing steered wheels (front road wheels) to pivot to one side or the other side for steering. Pinion P formed on the lower end of steering shaft S and rack shaft 23, which is the major cross member of the steering linkage and whose rack portion meshes with the pinion, construct the rack-and-pinion steering gear. The rack-and-pinion steering gear (23, P) and steering shaft S construct the steering mechanism. As clearly shown in FIG. 1, a steering torque sensor 31 is installed on steering shaft S, for detecting the magnitude and sense of steering torque applied to steering shaft S via steering wheel SW by the driver. The sense of the applied steering torque means the direction of rotation of steering shaft S. Torque sensor 31 outputs an informational data signal to an electronic control unit (ECU) 30 (described later). A power steering device is mounted on rack shaft 23, for assisting axial movement (linear motion) of rack shaft 23 responsively to the steering torque indicative signal from torque sensor 31. The power steering device is mainly comprised of hydraulic power cylinder 20 and reversible pump 2. Reversible pump 2 is driven by an electric motor 1. Power cylinder 20 accommodates therein a piston 24, so that a pair of hydraulic chambers 21 and 22 are defined on both sides of piston 24. The first hydraulic chamber 21 is connected via a first pressure line (or a first working-fluid passage or a first fluid line) 10 to a first discharge port of pump 2, whereas the second hydraulic chamber 22 is connected via a second pressure line 11 to a second discharge port of pump 2. One end of a first inflow line 10a is connected to the upstream end of first pressure line 10, while the other end of first inflow line 10a is connected through a first inflow check valve 3 to a reservoir 5. In a similar manner, one end of a second inflow line 11a is connected to the upstream end of second pressure line 11, while the other end of second inflow line 11a is connected through a second inflow check valve 4 to reservoir 5. A communicating circuit or a bypass circuit (12, 13) is disposed between first and second pressure lines 10 and 11 so as to directly intercommunicate them not through pump 2. The communicating circuit (12, 13) is comprised of first and second communicating lines 12 and 13 joined to each other upstream of reservoir 5. A drain line 14 is connected at one end to the joined portion of first and second communicating lines 12 and 13. The end of drain line 14 is connected to reservoir 5. A normally-open, single solenoid-actuated two-position spring-offset directional control valve 6 is disposed in drain line 14. In other words, the joined portion of first and second communicating lines 12 and 13 is connected via directional control valve 6 and drain line 14 to reservoir 5. A first one-way check valve (or a first one-way directional control valve) 7 is disposed in first communicating line 12 for preventing back flow from the communicating circuit (i.e., first communicating line 12) to first pressure line 10. In a similar manner, a second one-way check valve (or a second one-way directional control valve) 8 is disposed in second communicating line 13 for preventing back flow from the communicating circuit (i.e., second communicating line 13) to second pressure line 11. In the shown embodiment, each of first and second one-way check valves 7 and 8 is comprised of a ball check valve having a ball held by a spring against a seat. In lieu thereof, each of check valves 7 and 8 may be comprised of a spring-loaded poppet check valve.

ECU (power-steering controller) 30 generally comprises a microcomputer. ECU 30 includes an input/output interface (I/O), memories (RAM, ROM), and a microprocessor or a central processing unit (CPU). As discussed above, the input/output interface (I/O) of ECU 30 receives the steering-torque indicative signal from torque sensor 31. Additionally, the input/output interface (I/O) of ECU 30 receives input information from various engine/vehicle switches and sensors, for example, an ignition switch 33, an engine speed sensor (a crank angle sensor), a vehicle speed sensor, and a current sensor 32. Ignition switch 33 generates an ignition switch signal indicative of whether the ignition switch is turned ON or OFF. The engine speed sensor generates a signal indicative of engine speed Ne, whereas the vehicle speed sensor generates a signal indicative of vehicle speed V. On the other hand, current sensor 32 generates a current-value indicative signal representative of a current value $I_{motor}$ of electric current applied to reversible motor 1. Within ECU 30, the central processing unit (CPU) allows the access by the I/O interface of input informational data signals from the previously-discussed engine/vehicle switches and sensors. The CPU of ECU 30 is responsible for carrying the predetermined control program stored in memories and is capable of performing necessary arithmetic and logic operations containing a power-steering system control management processing (containing reversible motor control and solenoid valve control). That is, the processor of ECU 30 is comprised of a reversible motor control circuit (or a reversible motor control section) for motor control and a solenoid-actuated directional control valve control circuit for solenoid valve control (exactly, solenoid exciting-current control). Computational results (arithmetic calculation results), that is, calculated output signals (command signals) are relayed through the output interface circuitry of ECU 30 to output stages, namely motor 1 and an electromagnetic solenoid (an electrically energized coil) of directional control valve 6 both included in the power steering control system. Concretely, the magnitude and sense of the steering assistance force are determined based on the signals from the previously-discussed engine/vehicle switches and sensors, in particular, the sensor signal from torque sensor 31. The operating state of directional control valve 6, in other words, a current value of exciting current applied to the solenoid of directional control valve 6 is determined based on the current value of electric current flowing through reversible motor 1, detected by current sensor 32, as described later in reference to the flow charts shown in FIGS. 3–4. The output interface of ECU 30 outputs command signals, whose signal values are determined based on the computed results, to the reversible motor 1 and directional control valve 6.

Figure 2:
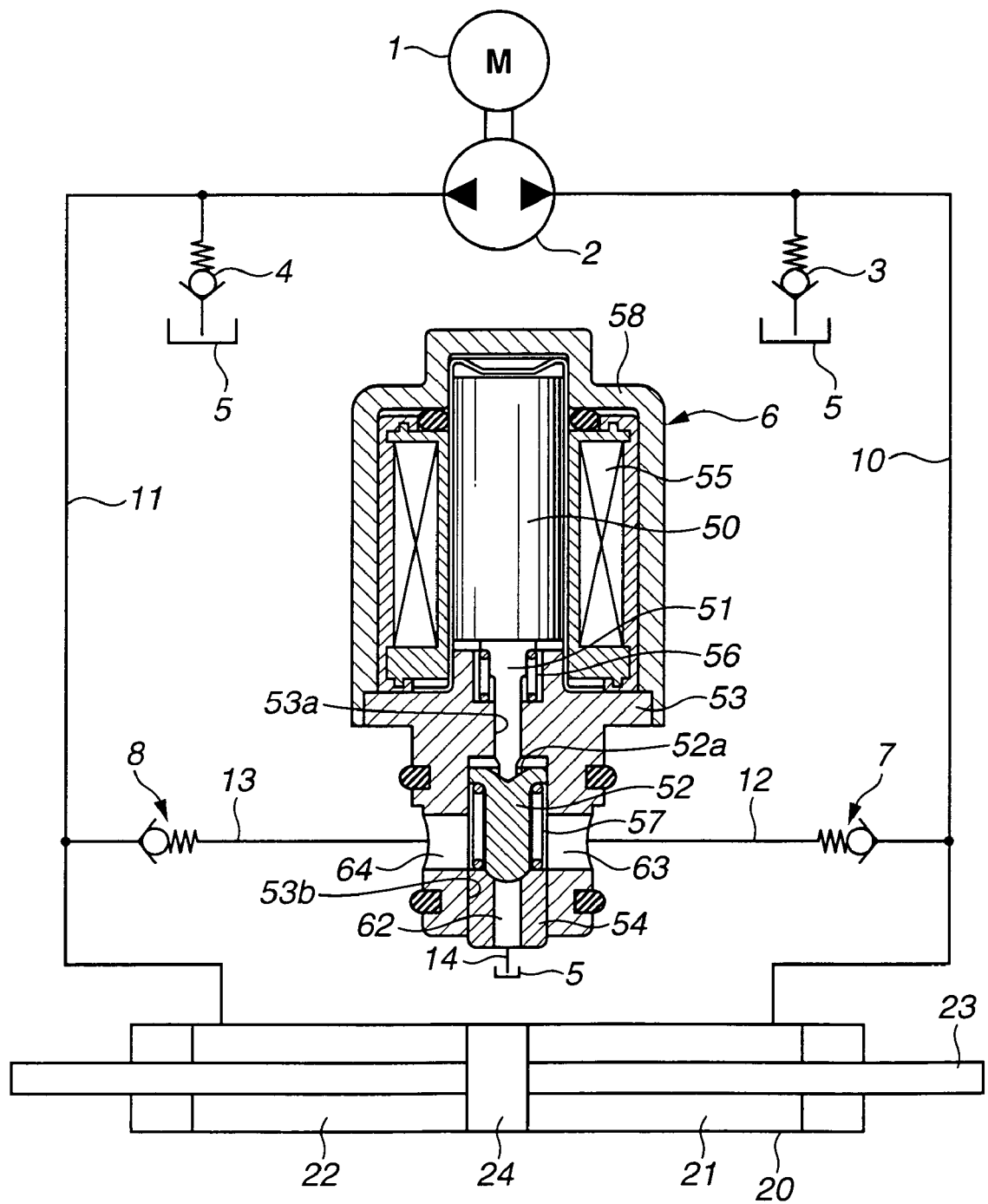
FIG. 2 is an enlarged, longitudinal cross-sectional view showing the detailed construction of a solenoid-actuated directional control valve incorporated in the power steering system of the embodiment.

Referring now to FIG. 2, there are shown the enlarged cross section concerning the detailed construction of solenoid-actuated directional control valve 6 and the hydraulic circuit diagram of the essential part of the power steering system of the embodiment. Directional control valve 6 is comprised of an electrically energized coil (electric solenoid) 55, an armature 50, a solenoid housing 58, and a valve housing 53. Armature 50, coil 55, and solenoid housing 58 construct a solenoid unit. First and second poppets 51 and 52 are axially slidably accommodated in a stepped axial bore (53a, 53b) formed in valve housing 53. In more detail, first poppet 51 is slidably disposed in a relatively small-diameter bore 53a of stepped axial bore (53a, 53b), whereas second poppet 52 is slidably disposed in a relatively large-diameter bore 53b of stepped axial bore (53a, 53b). When coil 55 is energized in response to a command signal from the output interface of ECU 30, it creates an electromagnetic force that pulls or attracts the armature into the coil. As clearly shown in FIG. 2, solenoid housing 58 has a cylindrical bore closed at the upper end. Coil 55 is installed in the cylindrical bore of solenoid housing 58 and arranged annularly along the inner periphery of solenoid housing 58, so that armature 50 is axially slidable in the coil. Valve housing 53 is press-fitted to the lower opening end of solenoid housing 58. As can be seen from the hydraulic circuit diagram of FIG. 2, actually, valve housing 53 of directional control valve 6 is located and joined to the joined portion of first and second communicating lines 12 and 13. A first return spring 56 is built in and operably disposed in valve housing 53 to permanently bias first poppet 51 in an axially upward direction. A second return spring 57 is also built in and operably disposed in valve housing 53 to permanently bias second poppet 52 in the axially upward direction. A cylindrical valve seat (a second poppet valve seat) 54 is press-fitted to the lowermost opening end of large-diameter bore 53b of stepped axial bore (53a, 53b). Valve seat 54 is formed with an axial communication bore 62 whose lower opening end communicates reservoir 5 through drain line 14. Communication bore 62 serves as a drain port through which working fluid is directed to the reservoir 5. The upper opening end of communication bore 62 is formed as a substantially semi-spherically chamfered valve-seat portion on which second poppet 52 seats. Valve housing 53 is also formed with a first communication port 63 communicating the first communicating line 12 and a second communication port 64 communicating the second communicating line 13. In directional control valve 6 incorporated in the hydraulic power steering system of the embodiment, second poppet 52 has a conically-chamfered, upper valve seat portion (first poppet valve seat) 52a on which first poppet 51 seats. The upper end of first poppet 51 is fixedly connected to the bottom of armature 50. Armature 50, first poppet 51, second poppet 52, and valve seat 54 formed with communication bore (drain port) 62 are axially aligned with each other (see the longitudinal cross section shown in FIG. 2).

[During Turned-Off Period of Ignition Switch]

With the previously-discussed valve construction of directional control valve 6, when the ignition switch is turned OFF, coil 55 is de-energized and thus armature 50 is forced in the axially upward direction by the spring bias of first spring 56 acting on first poppet 51. Thus, first poppet 51 is held at its uppermost position (unactuated position). At this time, second poppet 52 axially upwardly moves away from valve seat 54 by the spring bias of second spring 57. As a result of this, first and second poppets 51 and 52 are held at their unactuated positions. Under the unactuated condition or under the de-energized condition where first poppet 51 is held at the uppermost position and additionally seated on the conically-chamfered valve seat portion 52a and second poppet 52 is lifted off its seat, first and second communication ports 63 and 64 and communication bore (drain port) 62 are communicated with each other. Thus, each of first and second communicating lines 12 and 13 (the communicating circuit) is communicated with reservoir 5 via drain line 14.

[During Turned-On Period of Ignition Switch]

Conversely when the ignition switch is turned ON, coil 55 is energized and thus armature 50 is pulled or attracted in the axially downward direction by way of the electromagnetic force created by coil 55. Thus, first poppet 51 moves down against the spring bias (spring force) of first spring 56. The poppet valve portion of first poppet 51 is seated on the conically-chamfered valve seat portion 52a of second poppet 52. At this time, owing to the downward motion of first poppet 51, second poppet 52 also moves down against the spring bias of second spring 57. The poppet valve portion of second poppet 52 is forced and seated on the upper semi-spherically chamfered valve-seat portion of valve seat 54, so as to block working fluid flow through communication bore (drain port) 62 of valve seat 54 to drain line 14. Under the actuated condition or under the energized condition where first poppet 51 is held at the lowermost position and seated on the conically-chamfered valve seat portion 52a and second poppet 52 is also held seated on valve seat 54, fluid-communication between communication bore (drain port) 62 and each of first and second communication ports 63 and 64 is blocked. Thus, when pump 2 is driven to produce a desired steering assistance force and as a result hydraulic pressure is supplied from pump 2 to either one of first and second hydraulic chambers 21 and 22, there is a less possibility of working-fluid leakage from the closed-loop hydraulic circuit to reservoir in the energized state of coil 55, in other words, with communication bore (drain port) 62 fully closed or shut off by directional control valve 6. This is because directional control valve 6 of the hydraulic power steering system of the embodiment has a double poppet valve mechanism constructed by first and second poppets 51 and 52 and having a less tendency of working-fluid leakage as compared to a spool valve structure. In the energized state of coil 55 or with directional control valve 6 held at the closed position, the system of the embodiment ensures a power steering mode (or a power-assist control mode) at which steering assistance is produced.

[Normal Power-Assist Control]

Suppose that the power steering system is unfailed and thus conditioned in the normal power-assist control mode (i.e., in the normal power steering mode), and additionally steering wheel SW is turned in a rotational direction by the driver to move rack shaft 23 in the axially leftward direction (viewing FIGS. 1–2). At this time, torque sensor 31 detects or monitors the magnitude and sense of steering torque applied to steering shaft S via steering wheel SW by the driver, and generates an informational data signal indicative of the magnitude and sense of the driver-applied steering torque. A command signal (or a drive signal), which is determined based on the informational data signal from torque sensor 31, is output from ECU 30 to motor 1 to properly drive reversible pump 2 for steering assistance. As discussed above, in presence of the rotary motion of steering wheel SW and axially leftward movement of rack shaft 23, when motor 1 is driven responsively to the drive signal based on the sensor signal from torque sensor 31, reversible pump 2 operates to feed working fluid (power-steering fluid) from second hydraulic chamber 22 therevia to first hydraulic chamber 21. The working fluid flow from second hydraulic chamber 22 via pump 2 to first hydraulic chamber 21 creates a pressure buildup on the right-hand side of piston 24 and simultaneously creates a pressure drop on the left-hand side of piston 24. By virtue of the greater hydraulic pressure in first hydraulic chamber 21, in other words, the higher pressure applied to the right-hand side of piston 24, piston 24 is pushed axially leftwards (viewing FIGS. 1–2) to produce a steering assistance force, thus reducing steering effort. As described previously, to provide steering assistance in presence of the rotary motion of steering wheel SW and axially leftward movement of rack shaft 23, flow of working fluid stored in second hydraulic chamber 22 via pump 2 to first hydraulic chamber 21 is used for a pressure buildup of working fluid in first hydraulic chamber 21. In addition to the use of working fluid stored in second hydraulic chamber 22, flow of working fluid from reservoir 5 via second inflow check valve 4 and pump 2 to first hydraulic chamber 21 may be used for a pressure buildup on the right-hand side of piston 24. Under a condition where the working-fluid flow from second hydraulic chamber 22 via pump 2 to first hydraulic chamber 21 is occurring, suppose that the hydraulic pressure in first communicating line 12 of the communicating circuit (the bypass circuit) is low. In such a case, part of the working fluid flow from first pressure line 10 to first hydraulic chamber 21 is also supplied into first communicating line 12, and whereby the hydraulic pressure of working fluid supplied into first communicating line 12 is charged in the communicating circuit (12, 13) by means of first and second check valves 7 and 8 and directional control valve 6 closed. In other words, when the pressure level of working fluid discharged from pump 2 is higher than the hydraulic pressure charged in the communicating circuit, a rise in hydraulic pressure in the communicating circuit occurs. Conversely when the pressure level of working fluid discharged from pump 2 is lower than the hydraulic pressure charged in the communicating circuit, the hydraulic pressure in the communicating circuit is kept constant by means of first and second check valves 7 and 8 and directional control valve 6 closed. As can be appreciated from the above, during the normal power steering mode (or during the normal power-assist control mode), with directional control valve 6 fully closed, hydraulic pressure P, charged in the communicating circuit (12, 13) by means of two check valves 7 and 8, is high, and thus each of check valves 7 and 8 is held in a no-flow condition. With check valves 7 and 8 held in their no-flow conditions, fluid communication between first and second pressure lines 10 and 11 is blocked during the normal power-assist control mode (with the ignition switch turned ON or with solenoid-actuated directional control valve 6 energized and fully closed). As set forth above, in the power steering system of the embodiment shown in FIGS. 1–2, the poppet valve mechanism is utilized as the directional control valve joined to the communicating circuit (12, 13), thus ensuring the more enhanced fluid-tight seal performance and reliable operation of the directional control valve. The hydraulic operation of the hydraulic power steering system of the embodiment for the opposite rotary motion of steering wheel SW is similar to that described for the rotary motion of steering wheel SW, except that the direction of working-fluid flow from second hydraulic chamber 22 via pump 2 to first hydraulic chamber 21 is changed to the direction of working-fluid flow from first hydraulic chamber 21 via pump 2 to second hydraulic chamber 22. For the purpose of simplification of the disclosure, detailed description of the hydraulic operation for the opposite rotary motion of steering wheel SW (axially rightward movement of rack shaft 23) will be omitted.

In contrast to the above, in presence of the power steering system failure, ECU 30 controls directional control valve 6 to open first and second poppets 51 and 52, i.e., coil 55 is deenergized, and directional control valve 6 is shifted from the closed state to the open state in which hydraulic pressure P, charged in the communicating circuit (12, 13) by means of two check valves 7 and 8, becomes low. And thus each of check valves 7 and 8 is held in a free-flow condition. With check valves 7 and 8 held in their free-flow conditions, fluid communication between first and second pressure lines 10 and 11 is established, thus permitting the hydraulic pressure to be smoothly relieved from each of first and second pressure lines 10 and 11 to the reservoir during a transition from the normal power-assist control mode to the manual steering mode with solenoid-actuated directional control valve 6 de-energized and shifting to its fully opened state. In detail, when steering wheel SW is operated and piston 24 is pushed axially leftwards, working fluid comes out second hydraulic chamber 22 and goes to reservoir 5 via second check valve 8 and second communicating circuit 13. On the other hand, working fluid provided to first hydraulic chamber 21 comes from reservoir 5 via first inflow check valve 3 and first pressure line 10.

[Operation of Directional Control Valve Closed]

Hereinafter described is the operation of directional control valve 6 held at its closed position in the power steering system unfailed state, in other words, in the solenoid-energized state under the condition where the hydraulic pressure charged in the communicating circuit is present. Assuming that a pressure value of the hydraulic pressure charged in the communicating circuit (12, 13) is denoted by "P", an attracting force (electromagnetic force) created by coil 55 is denoted by "Fs", and a spring bias of first spring 56 is denoted by "Fk1", the summed force (the resultant force) Fs1 of two forces (or two pressures) acting on first poppet 51 is represented by the following expression.

$$Fs1 = Fs - Fk1$$

where the force denoted by "Fs" is the attracting force that pulls armature 50 into coil 55, and the force denoted by "Fk1" is the spring bias (reaction force) of first spring 56.

Next, on the assumption that (i) the pressure applied from first poppet 51 to second poppet 52 is equivalent to the summed force Fs1 (=Fs−Fk1) of forces acting on first poppet 51, (ii) a spring bias of second spring 57 is denoted by "Fk2", and (iii) an effective cross-sectional area of axial communication bore (drain port) 62 is denoted by "As2", the summed force (the resultant force) Fs2 of three forces (or three pressures) acting on second poppet 52 is represented by the following expression.

$$Fs2 = Fs1 + Fp2 - Fk2$$

where the force denoted by "Fs1" is the summed force of two forces acting on first poppet 51, in other words, the axial force applied from first poppet 51 to second poppet 52, the force denoted by "Fp2" is a pressure force acting on second poppet 52 by the pressure differential between hydraulic pressure P in the communicating circuit (12, 13) and hydraulic pressure in drain line 14, and the force denoted by "Fk2" is the spring bias (reaction force) of second spring 57.

Under the energized condition of coil 55 (with directional control valve 6 closed), second poppet 52 is held seated on valve seat 54, and therefore the pressure force Fp2 given by the product (P·As2) of the hydraulic pressure P in the communicating circuit (12, 13) and effective cross-sectional area As2 of communication bore (drain port) 62 acts on second poppet 52, such that second poppet 52 is forced downwards. Assuming that the downward force is positive, second poppet 52 can be held seated on valve seat 54 under a specific condition defined by the inequality Fs2=(Fs1+Fp2−Fk2)≧0. In other words, when the condition defined by the inequality $Fs1+Fp2 \geq Fk2$ is satisfied, second poppet 52 is held seated on valve seat 54.

As discussed above, the hydraulic pressure P, charged in the communicating circuit (12, 13) by means of first and second check valves 7 and 8, produces an assisting force that acts in the direction of closing of directional control valve 6 (in particular, second poppet 52), when closing directional control valve 6 by turning the ignition switch ON. This contributes to the reduced current value of exciting current applied to coil 55 during the normal power steering mode, that is, down-sizing of coil 55, in other words, the reduced total size of directional control valve 6.

[Operation of Directional Control Valve in Transition from Closed to Open State]

Hereinafter described is the operation of directional control valve 6 in a transition from the closed position (the solenoid-energized state) to the open position (the solenoid-deenergized state), under the condition where the hydraulic pressure P charged in the communicating circuit (12, 13) is present. Just before switching to the solenoid-deenergized state, coil 55 is still held in the energized state, and thus the downward force, which is created owing to the electromagnetic force Fs created by coil 55, acts on each of first and second poppets 51 and 52. Additionally, the pressure force $Fp2$ (=$P \cdot As2$), created by hydraulic pressure P charged in the communicating circuit (12, 13), acts on second poppet 52, such that second poppet 52 is forced downwards. Under these conditions, suppose that coil 55 is changed from the energized state (ON state) to the deenergized state (OFF state) at a first switching point t1. Simultaneously with switching to the deenergized (OFF) state at the first switching time t1, the attracting force Fs of armature 50 rapidly drops to zero. Under the condition where the hydraulic pressure P in the communication circuit is kept substantially constant before the first switching time point t1, the summed force Fs1 of two forces acting on first poppet 51 tends to reduce owing to the rapid drop in attracting force Fs from the first switching point t1. Just after the first switching point t1, when the condition defined by the inequality $Fs \geq Fk1$ becomes unsatisfied and thus the reaction force (upward force) Fk1 of spring 56 becomes greater than the electromagnetic force Fs created by coil 55 ($Fs<Fk1$), first poppet 51 begins to move up. Owing to the upward motion of first poppet 51, arising from the reaction force Fk1 ($>Fp1$) of spring 56, first poppet 51 moves apart from the conically-chamfered valve seat portion 52a of second poppet 52, and thus there is no application of axial force Fs1 applied from first poppet 51 to second poppet 52, that is, Fs1=0. Thus, just after the first switching point t1, the summed force Fs2 of three forces acting on second poppet 52 is represented as follows.

$$Fs2=Fs1+Fp2-Fk2=0+Fp2-Fk2=P \cdot As2-Fk2$$

Just after the first switching point t1, the mutual relationship among hydraulic pressure P in the communication circuit, reaction force Fk2 of second spring 57, and effective cross-sectional area As2 of communication bore (drain port) 62 is set to satisfy the condition defined by the inequality $Fp2>Fk2$. The inequality $Fp2>Fk2$ means that second poppet 52 is still forced downwards by means of the downward force ($Fp2-Fk2>0$) just after the first switching point t1. In this manner, by way of the proper setting of hydraulic pressure P charged in the communication circuit, reaction force Fk2 of second spring 57, and effective cross-sectional area As2 of communication bore 62, for a brief moment just after switching to the de-energized state of coil 55, it is possible to maintain the desired condition where only the second poppet 52 is held seated inside the directional control valve while the first poppet 51 is not held seated. With first poppet 51 unseated and second poppet 52 seated, hydraulic pressure P in the communicating circuit (12, 13) is relieved through communication bore (drain port) 62 to drain line 14. Thus, hydraulic pressure P in the communicating circuit begins to reduce. As a result of the reduction in hydraulic pressure P, the pressure force Fp2 (=$P \cdot As2$) acting on second poppet 52 also begins to reduce.

As soon as hydraulic pressure P in the communicating circuit (12, 13) reaches a predetermined hydraulic pressure value $P_0$ at a second switching point t2, slightly retarded from the first switching point t1, and reduces to below the predetermined hydraulic pressure value $P_0$, the pressure force Fp2 (=$P \cdot As2$) acting on second poppet 52 becomes less than the reaction force Fk2 of second spring 57 and thus second poppet 52 is forced off its seat 54. In this manner, the poppet valve portion of second poppet 52 can be switched from the closed state to the open state, and then the hydraulic pressure P can be relieved from the communicating circuit (12, 13) directly through communication bore 62 of valve seat 54 to drain line 14. The previously-noted predetermined hydraulic pressure value $P_0$ is a preset pressure value, which is properly determined or settable based on the reaction force Fk2 of second spring 57 and effective cross-sectional area As2 of communication bore 62.

[Exciting-Current Control for Solenoid-Actuated Directional Control Valve During Normal Power-Assist Control Mode]

Figure 3:
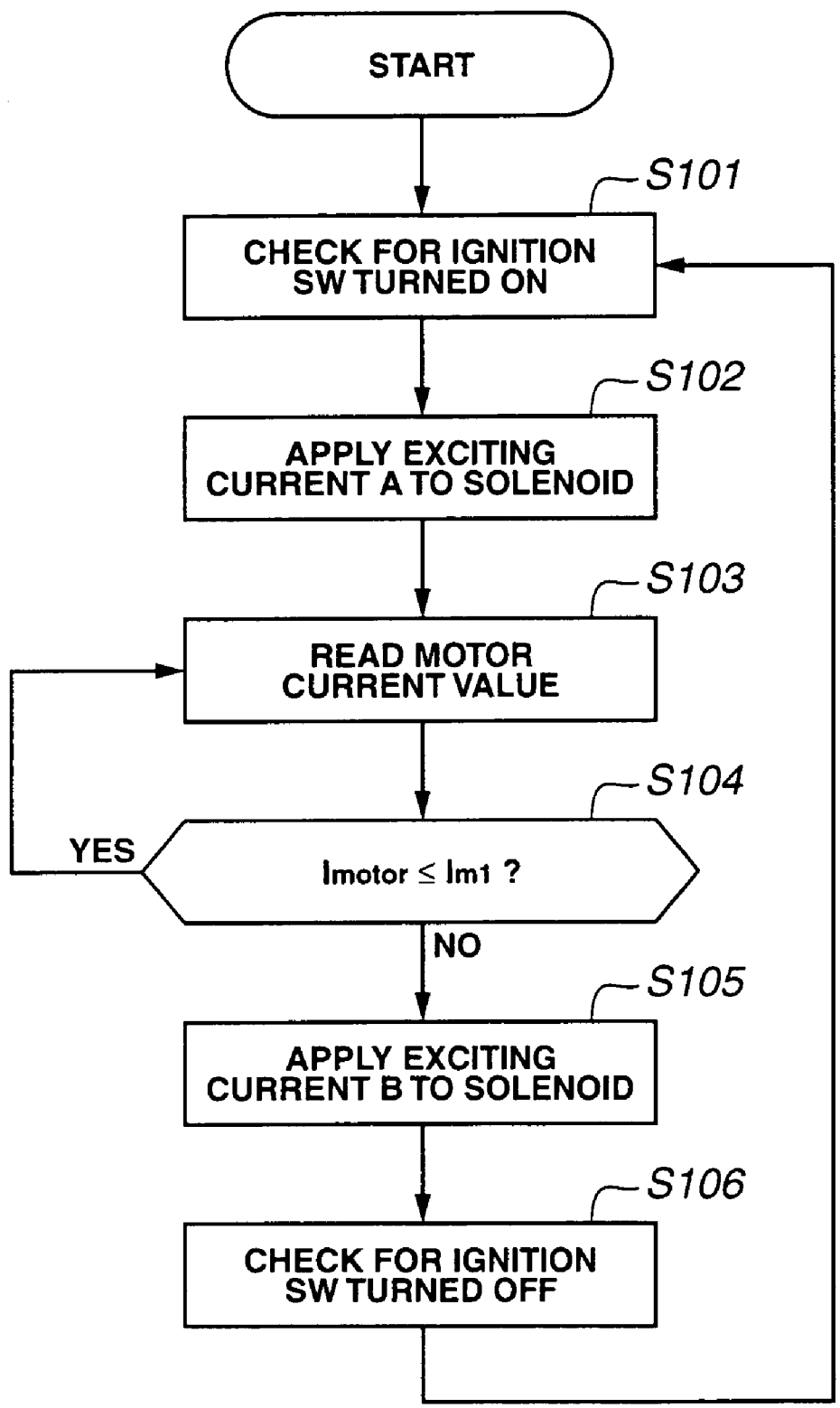
FIG. 3 is a flow chart illustrating an exciting-current control sub-routine for a solenoid-actuated directional control valve during a normal power-assist control mode.

Referring now to FIG. 3, there is shown the exciting-current control sub-routine for solenoid-actuated directional control valve 6. The solenoid exciting-current control routine shown in FIG. 3 is executed as time-triggered interrupt routines to be triggered every predetermined sampling time intervals.

At step S101, a check is made to determine whether the ignition switch is turned ON. When ignition switch 33 is turned ON, the routine proceeds from step S101 to step S102, to initiate the solenoid exciting-current control routine. Conversely when ignition switch 33 is turned OFF, the routine returns to the main program.

At step S102, a relatively high exciting current A of a first predetermined current value is applied to electrically energized coil (electromagnetic solenoid) 55 of directional control valve 6.

At step S103, a motor current value $I_{motor}$ of electric current flowing through reversible motor 1, detected by current sensor 32, is read.

At step S104, a check is made to determine whether motor current value $I_{motor}$ is less than or equal to a predetermined threshold current value (a first threshold value) $I_{m1}$. When the answer to step S104 is in the affirmative ($I_{motor} \leq I_{m1}$), the routine returns from step S104 to step S103, so as to continuously read out the motor current value $I_{motor}$ of electric current applied to motor 1. Conversely when the answer to step S104 is in the negative ($I_{motor}>I_{m1}$), the routine proceeds from step S104 to step S105.

At step S105, a relatively low exciting current B of a second predetermined current value (lower than the first predetermined current value) is applied to coil (solenoid) 55. After step S105, step S106 occurs.

At step S106, a check is made to determine whether the ignition switch is turned OFF. When ignition switch 33 is turned OFF, the routine proceeds from step S106 to the main program. Conversely when ignition switch 33 is turned ON, the routine proceeds from step S106 again to step S101, so as to repeatedly execute the solenoid exciting-current control routine.

The logic operations of steps S101–S106 of the solenoid exciting-current control routine of FIG. 3 are hereunder described in detail.

When an ignition-switch turned ON signal from ignition switch 33 is detected and read through step S101, a command signal is generated to the solenoid (coil 55) to initiate the power closing of directional control valve 6. Suppose that steering wheel SW is not yet turned by the driver at the initial stage of turning-ON operation of ignition switch 33, and thus the pressure value of hydraulic pressure P charged in the communicating circuit (12, 13) is still low. The low hydraulic pressure P means that an assisting force acting in the direction of closing of directional control valve 6 (in particular, second poppet 52) by the pressure force Fp2 (=P·As2) created by hydraulic pressure P charged in the communicating circuit (12, 13) is also low. Thus, to overcome the return spring force with the slight assisting force (with the less pressure force Fp2 (=P·As2)), the relatively high exciting current A having the first predetermined current value must be applied to the solenoid (coil 55) of directional control valve 6, so as to complete the power closing of directional control valve 6 (see the flow from step S101 to step S102).

Next, motor current value $I_{motor}$ of electric current applied to motor 1, detected by current sensor 32, is read. Thereafter the pressure value of hydraulic pressure P charged in the communicating circuit (12, 13) is determined and estimated based on motor current value $I_{motor}$ (see steps S103–S104). This is because the hydraulic pressure of a maximum pressure value of discharge pressure from pump 2 tends to be charged in the communicating circuit (12, 13) by means of first and second check valves 7 and 8 and directional control valve 6 closed. Thus, when the discharge pressure from pump 2 is high, the electrical load on motor 1 is also high and therefore motor current value $I_{motor}$ tends to become high. Conversely when the discharge pressure from pump 2 is low, the electrical load on motor 1 is low and therefore motor current value $I_{motor}$ tends to become low. As set forth above, there is a correlation between the pump discharge pressure (substantially corresponding to hydraulic pressure P charged in the communicating circuit) and motor current value $I_{motor}$. Thus, it is possible to estimate the pressure value of hydraulic pressure P charged in the communicating circuit based on motor current value $I_{motor}$. The condition defined by the inequality $I_{motor} \leq I_{m1}$ means that hydraulic pressure P charged in the communicating circuit is not adequately high and thus the hydraulic pressure acting on directional control valve 6, in other words, the pressure force Fp2 created by hydraulic pressure P and acting on second poppet 52 in the valve closing direction, is insufficient. As discussed above, when hydraulic pressure P to be charged in the communicating circuit (12, 13) has not yet developed up to the desirable high pressure level and thus the assisting force acting in the direction of closing of directional control valve 6 (in particular, second poppet 52) by the pressure force Fp2 (=P·As2) created by hydraulic pressure P charged in the communicating circuit (12, 13) is insufficient or low. Thus, relatively high exciting current A having the first predetermined current value must be continuously applied to the solenoid (coil 55) of directional control valve 6, so as to certainly shift directional control valve 6 to the closed position. Thereafter, when the detected motor current value $I_{motor}$ exceeds predetermined threshold current value (the first threshold value) $I_{m1}$ with directional control valve 6 closed, there is an increased tendency for the adequately high hydraulic pressure to be charged in the communicating circuit (12, 13). Under the condition defined by the inequality $I_{motor} > I_{m1}$, the processor of ECU 30 of the power steering system of the embodiment determines that the assisting force acting in the direction of closing of directional control valve 6 (in particular, second poppet 52) by the pressure force Fp2 (=P·As2) created by hydraulic pressure P charged in the communicating circuit (12, 13) is sufficient. Therefore, when the condition defined by the inequality $I_{motor} > I_{m1}$ is satisfied (see the flow from step S104 to step S105), it is possible to keep directional control valve 6 at its closed position by way of application of the relatively low exciting current B having the second predetermined current value lower than the first predetermined current value to the solenoid (coil 55) of directional control valve 6, while effectively suppressing and reducing electric power consumption, by virtue of the adequate assisting force acting in the direction of closing of directional control valve 6 (in particular, second poppet 52) by the pressure force Fp2 (=P·As2) created by hydraulic pressure P. It is possible to avoid the high electric load from being continuously imposed on motor 1 by switching from relatively high exciting current A to relatively low exciting current B depending on the comparison result of motor current value $I_{motor}$ and predetermined threshold current value $I_{m1}$. This contributes to down-sizing of the solenoid (coil 55) of directional control valve 6.

Figure 4:
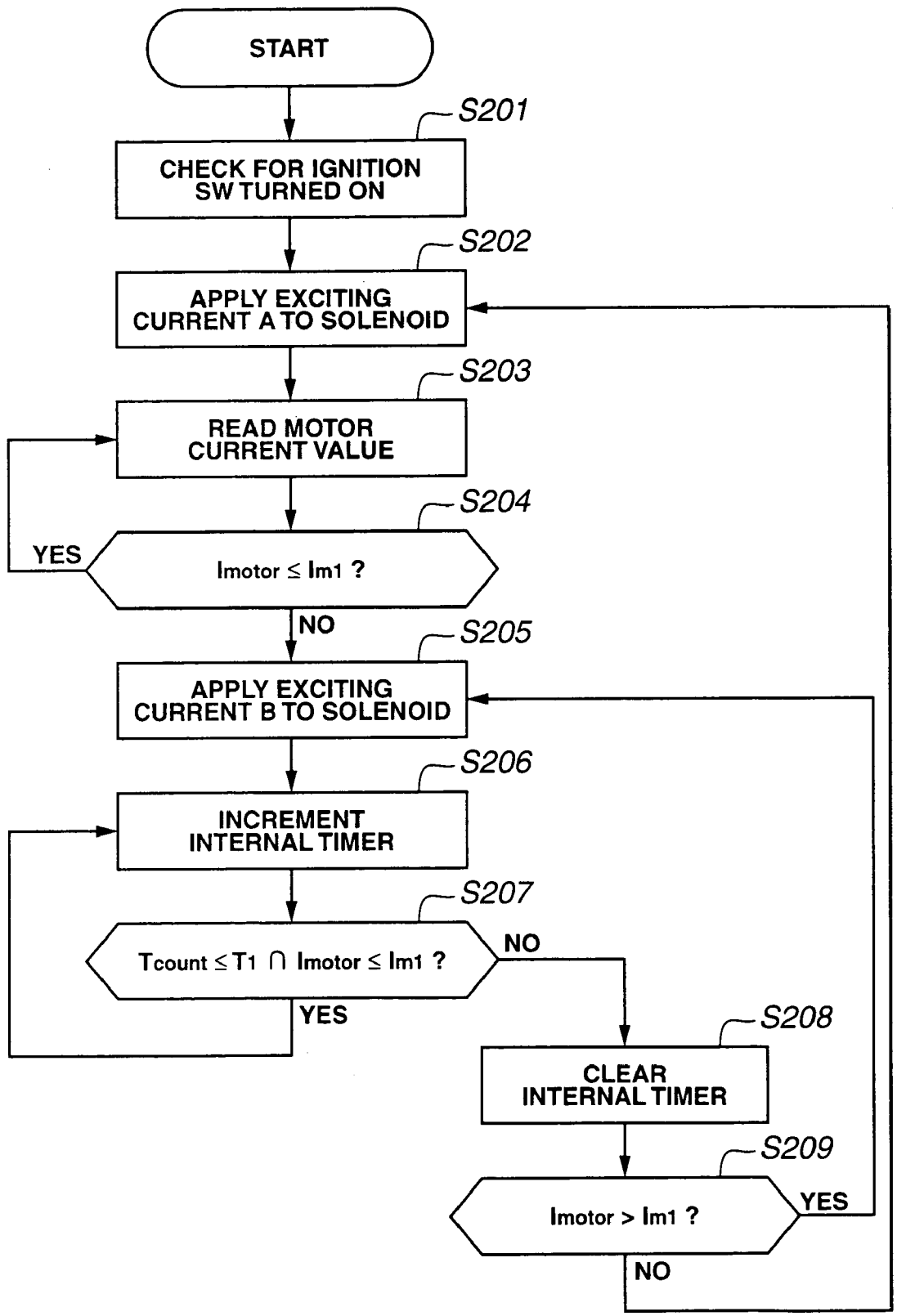
FIG. 4 is a flow chart illustrating a modified exciting-current control sub-routine including a leakage check processing for working-fluid leakage from the solenoid-actuated directional control valve.

Referring now to FIG. 4, there is shown the modified exciting-current control routine including a leakage check processing for working-fluid leakage from the solenoid-actuated directional control valve 6. As hereunder described in detail, the working-fluid leakage check processing is performed by means of an internal timer 30a included in ECU 30. The modified exciting-current control routine shown in FIG. 4 is also executed as time-triggered interrupt routines to be triggered every predetermined sampling time intervals. The modified exciting-current control routine of FIG. 4 is similar to the exciting-current control routine of FIG. 3, except that step S106 included in the routine shown in FIG. 3 is replaced with steps S206–S209 included in the routine shown in FIG. 4. Steps S201–S205 included in the routine shown in FIG. 4 are identical to steps S101–S105 included in the routine shown in FIG. 3. Thus, steps S206–S209 of the routine of FIG. 4 will be hereinafter described in detail with reference to the accompanying drawings, while detailed description of steps S201–S205 will be briefly discussed.

At step S201, a check is made to determine whether the ignition switch is turned ON. When ignition switch 33 is turned ON, the routine proceeds from step S201 to step S202, to initiate the modified solenoid exciting-current control routine. Conversely when ignition switch 33 is turned OFF, the modified routine returns to the main program.

At step S202, relatively high exciting current A of the first predetermined current value is applied to electrically energized coil (electromagnetic solenoid) 55 of directional control valve 6.

At step S203, a motor current value $I_{motor}$ of electric current applied to reversible motor 1, detected by current sensor 32, is read.

At step S204, a check is made to determine whether motor current value $I_{motor}$ is less than or equal to predetermined threshold current value (first threshold value) $I_{m1}$. When the answer to step S204 is in the affirmative ($I_{motor} \leq I_{m1}$), the routine returns from step S204 to step S203, so as to continuously read out the motor current value $I_{motor}$ of electric current applied to motor 1. Conversely when the answer to step S204 is in the negative ($I_{motor}>I_{m1}$), the routine proceeds from step S204 to step S205.

At step S205, relatively low exciting current B of the second predetermined current value (lower than the first predetermined current value) is applied to coil (solenoid) 55. After step S205, step S206 occurs.

At step S206, a count-up action of internal timer 30a is initiated and thus a count value $T_{count}$ of internal timer 30a is incremented by "1" from "0".

At step S207, a check is made to determine whether the count value $T_{count}$ of internal timer 30a is less than or equal to a predetermined count value (a second threshold value) $T_1$ and additionally motor current value $I_{motor}$ is less than or equal to predetermined threshold current value (the first threshold value) $I_{m1}$. When the answer to step S207 is in the affirmative (YES), that is, the condition defined by the inequality $T_{count} \leq T_1$) and the condition defined by the inequality $I_{motor} \leq I_{m1}$) are both satisfied ($T_{count} \leq T_1 \cap I_{motor} \leq I_{m1}$) the routine returns from step S207 to step S206, so as to continuously increment the count value of internal timer 30a. Conversely when the answer to step S207 is in the negative (NO), that is, the condition defined by the inequality $T_{count} \leq T_1$) is unsatisfied or the condition defined by the inequality $I_{motor} \leq I_{m1}$) is unsatisfied, in other words, the condition defined by the logical expression $T_{count}>T_1 \cup I_{motor}>I_{m1}$ is satisfied, the routine proceeds from step S207 to step S208.

At step S208, the count value of internal timer 30a is reset or cleared to "0". Thereafter, step S209 occurs.

At step S209, a check is made to determine whether motor current value $I_{motor}$ is greater than predetermined threshold current value (first threshold value) $I_{m1}$. When the answer to step S209 is in the affirmative ($I_{motor}>I_{m1}$), the routine returns from step S209 to step S205, in such a manner as to apply relatively low exciting current B of the second predetermined current value to coil (solenoid) 55. Conversely when the answer to step S209 is in the negative ($I_{motor} \leq I_{m1}$), the routine proceeds from step S209 to step S202 in such a manner as to apply relatively high exciting current A of the first predetermined current value to coil (solenoid) 55.

The logic operations of steps S201–S205 of the modified routine of FIG. 4 are identical to those of steps S101–S105 of the routine of FIG. 3. Thus, the logic operations of steps S206–S209 concerning the working-fluid leakage check processing will be hereinafter described in detail, while the logic operations of steps S201–S205 will be omitted because the above description thereon seems to be self-explanatory.

As can be appreciated from the flow from step S204 to step S205, when motor current value $I_{motor}$ exceeds predetermined threshold current value (first threshold value) $I_{m1}$ and thus the processor of ECU 30 determines that hydraulic pressure P charged in the communicating circuit is adequately high, the routine proceeds from step S204 to step S205 so that relatively low exciting current B is applied to coil (solenoid) 55 of directional control valve 6. At the same time, the count-up action of internal timer 30a starts and a count value of internal timer 30a is incremented at step S206. The count-up action of internal timer 30a is repeatedly executed (see the flow S206→S207→S206→S207→ S206 . . . ) until the previously-noted condition $T_{count} \leq T_1 \cap I_{motor} \leq I_{m1}$ becomes unsatisfied, in other words, the condition $T_{count}>T_1 \cup I_{motor}>I_{m1}$ becomes satisfied. As soon as the condition $T_{count} \leq T_1 \cap I_{motor} \leq I_{m1}$ becomes unsatisfied, in other words, the condition $T_{count}>T_1 \cup I_{motor}>I_{m1}$ becomes satisfied, the routine proceeds from step S207 to step S208 so that the internal timer 30a is cleared at step S208. After this, at step S209, a check is made to determine whether the reason that the previously-noted condition $T_{count} \leq T_1 \cap I_{motor} \leq I_{m1}$ becomes unsatisfied is based on motor current value $I_{motor}$ higher than predetermined threshold current value $I_{m1}$ (i.e., the condition of $I_{motor}>I_{m1}$) or based on termination of the count-up action of internal timer 30a (i.e., the condition of $T_{count}>T_1$). If motor current value $I_{motor}$ has exceeded predetermined threshold current value $I_{m1}$ and thus the previously-noted condition $T_{count} \leq T_1 \cap I_{motor} \leq I_{m1}$ has been unsatisfied based on the condition of $I_{motor}>I_{m1}$, the processor of ECU 30 determines that the pressure force Fp2 (=P·As2), created by hydraulic pressure P charged in the communicating circuit (12, 13) and acting on second poppet 52, is adequately high. Thus, under the condition of $I_{motor}>I_{m1}$, the routine proceeds from step S209 to step S205, in such a manner as to apply relatively low exciting current B to coil (solenoid) 55. On the contrary, when motor current value $I_{motor}$ has not yet exceeded predetermined threshold current value $I_{m1}$ and thus the previously-noted condition $T_{count} \leq T_1 \cap I_{motor} \leq I_{m1}$ has been unsatisfied based on the condition of $T_{count}>T_1$, ECU 30 operates to apply relatively high exciting current A to coil (solenoid) 55.

Hereinafter described in detail is the proper setting of predetermined count value (second threshold value) $T_1$ of internal-timer count value $T_{count}$. As described previously, when exciting current is applied to the solenoid (coil 55) of directional control valve 6 under the condition where the hydraulic pressure charged in the communicating circuit (12, 13) is present, directional control valve 6 is closed to block fluid communication between the communicating circuit and drain line 14. However, there is a slight leakage of working fluid from a very small aperture defined between valve seat 54 and second poppet 52 seated on its valve seat to drain line 14. In the hydraulic circuit of the power steering system of the embodiment utilizing the double poppet valve mechanism (first and second poppets 51 and 52) as directional control valve 6, the amount of leakage of working fluid from poppet valve 52 seated and closed to drain line 14 is comparatively small as compared to the spool valve structure. Owing to the slight leakage (undesirable leakage flow), hydraulic pressure P charged in the communicating circuit (12, 13) tends to gradually drop. Generally, the amount of leakage of working fluid from directional control valve 6 to drain line 14 (or drain port 62) has already been determined at the design phase of directional control valve 6 (in particular, the size and shape of the poppet valve structure) of the hydraulic circuit of the power steering system of the embodiment. Thus, under a specified condition corresponding to predetermined threshold current value $I_{m1}$ of motor current value $I_{motor}$, it is possible to easily estimate the amount of working-fluid leakage per unit time with directional control valve 6 closed. A pressure drop in hydraulic pressure P charged in the communicating circuit (12, 13) can be determined based on the estimated amount of working-fluid leakage per unit time. As may be appreciated, such a gradual pressure drop in hydraulic pressure P arising from working-fluid leakage, results in a gradual drop in pressure force Fp2 (=P·As2) acting on second poppet 52 by the pressure differential between hydraulic pressure P in the communicating circuit (12, 13) and hydraulic pressure in drain line 14. When a gradual drop in pressure force Fp2 (=P·As2), arising from a gradual pressure drop in hydraulic pressure P, is occurring, there is a possibility that it is difficult to certainly keep directional control valve 6 at its fully-closed position at which there is a less leakage of working fluid from second poppet 52 to drain port 62, in other words, there is an increased tendency for the axial position of second poppet 52 to be undesirably shifted from the fully-closed position to a partly-closed position at which there is a slight leakage of working fluid.

For the reasons discussed above, after initiation of count-up action of internal timer 30a, when (i) the condition (i.e., $I_{motor} \leq I_{m1}$) where the adequate hydraulic pressure (the hydraulic pressure corresponding to predetermined threshold current value $I_{m1}$) is not produced and (ii) the condition (i.e., $T_{count} > T_1$) where predetermined count value ($2^{nd}$ threshold value or a predetermined time period) $T_1$ of internal timer 30a started at step S206 has expired, are both satisfied, the processor of ECU 30 determines that the hydraulic pressure enough to certainly keep directional control valve 6 at its fully-closed position by virtue of attracting force Fs created by relatively low exciting current B applied to the solenoid (coil 55) is not yet satisfactorily charged in the communicating circuit. Therefore, under the condition of $I_{motor} \leq I_{m1}$ and $T_{count} > T_1$, the routine of FIG. 4 flows from step S207 through steps S208–S209 to step S202, to apply again relatively high exciting current A to the solenoid, so that the insufficiency of pressure force Fp2 (=P·As2) created by hydraulic pressure P charged in the communicating circuit (12, 13) is compensated for by the increased attracting force. In this manner, by the provision of steps S206–S209 concerning the working-fluid leakage check processing for the degree of leakage from directional control valve 6, it is possible to certainly continuously maintain directional control valve 6 at its fully-closed position during a time period that the power steering system is operating at the normal power-assist control mode after ignition switch 33 has been turned ON.

In the system of the shown embodiment, the hydraulic pressure in the hydraulic circuit of the hydraulic power steering system, in other words, the magnitude and sense of the steering assistance force can be determined based on the sensor signal generated from steering torque sensor 31 when steering wheel SW is turned by the driver after ignition switch 33 has been turned ON. In lieu thereof, immediately when ignition switch 33 has been turned ON, hydraulic pressure having a high pressure value may be produced by pump 2 regardless of the presence or absence of driver-applied steering, so as to pre-charge the adequately high hydraulic pressure in the communicating circuit (12, 13). The hydraulic-pressure pre-charging operation contributes to reduced electric power consumption of coil 55 of solenoid-actuated directional control valve 6.

As can be appreciated from the above, the hydraulic power steering system of the embodiment has the following effects (1)–(7).

(1) When the pressure differential between hydraulic pressure P charged in the communicating circuit (12, 13) by means of first and second check valves 7 and 8 and hydraulic pressure in drain line 14, is greater than or equal to a predetermined value substantially corresponding to predetermined hydraulic pressure value $P_0$ during the normal power-assist control mode, the solenoid-actuated directional control valve 6 is shut off by the pressure differential between hydraulic pressure P in the communicating circuit (12, 13) and hydraulic pressure in drain line 14. Thus, it is possible to decreasingly compensate for or reduce the exciting current applied to the solenoid of directional control valve 6 from relatively high exciting current A of the first predetermined current value to relatively low exciting current B of the second predetermined current value. Conversely when the pressure differential between hydraulic pressure P in the communicating circuit (12, 13) and hydraulic pressure in drain line 14 is less than the predetermined value substantially corresponding to predetermined hydraulic pressure value $P_0$ during the normal power-assist control mode, the solenoid-actuated directional control valve 6 cannot be satisfactorily shut off by only the pressure differential. The system of the embodiment increasingly compensates for or increases the exciting current applied to the solenoid of directional control valve 6 to relatively high exciting current A of the first predetermined current value, only in case of the insufficient pressure differential, in other words, the insufficient pressure force Fp2 (=P·As2). Therefore, during the normal power-assist control mode, it is possible to certainly the solenoid-actuated directional control valve 6 in its closed position.

(2) First and second communicating lines 12 and 13 are joined to each other upstream of reservoir 5. A single solenoid valve (exactly, single solenoid-actuated two-position spring-offset directional control valve) 6 is disposed between reservoir 5 and the joined portion of first and second communicating lines 12 and 13. By way of the use of the single solenoid valve serving as a directional control valve, it is possible to control (block or establish) fluid communication between reservoir 5 and each of first and second communicating lines 12 and 13. Thus, the system of the embodiment can provide several merits, such as simplified directional control valve device, reduced number of fittings to connect hydraulic lines between various components in a hydraulic system, reduced working-fluid leakage and contamination owing to fewer fittings, lower system installation time and costs, and smaller space requirements of the overall system.

(3) Solenoid-actuated directional control valve 6 is comprised of (i) a poppet valve mechanism (51, 52), and (ii) an electromagnetic solenoid unit (50, 55) including armature 50 fixedly connected to first poppet 51 of the poppet valve mechanism and coil 55 creating an attracting force that produces axial movement of the armature by switching coil 55 to the energized state and varying the axial position of the armature (first poppet 51) by switching between the solenoid de-energized state and the solenoid energized state. Thus, by the use of the comparatively simplified solenoid-actuated poppet valve structure, it is possible to realize smooth switching between a state where fluid communication between the communicating circuit (12, 13) and reservoir 5 is established and a state where fluid communication between the communicating circuit (12, 13) and reservoir 5 is blocked, by utilizing the pressure differential between hydraulic pressure P in the communicating circuit (12, 13) and hydraulic pressure in drain line 14.

(4) The solenoid-actuated directional control valve control circuit of ECU 30 determines or estimates, based on motor current value $I_{motor}$, the pressure value of hydraulic pressure P charged in the communicating circuit (12, 13) by means of first and second check valves 7 and 8 (see steps S103–S104 or steps S203–S204). As may be appreciated, a torque value of driving torque produced by motor 1 can be estimated based on motor current value $I_{motor}$. The estimated motor torque output value greatly correlates with the pressure value of hydraulic pressure P charged in the communicating circuit (12, 13) by means of check valves 7 and 8. Thus, it is possible to easily estimate the pressure value of hydraulic pressure P charged by utilizing motor current value $I_{motor}$ without installing an additional hydraulic pressure sensor. This contributes to reduced system installation time and costs.

(5) The solenoid-actuated directional control valve control circuit of ECU 30 has a feedback circuit that feedback-controls hydraulic pressure P charged in the communicating circuit (12, 13), so that the pressure differential between hydraulic pressure P in the communicating circuit (12, 13) and hydraulic pressure in drain line 14 is brought closer to a desired value higher than or equal to the predetermined value substantially corresponding to predetermined hydraulic pressure value $P_0$ during the normal power-assist control mode. Thus, it is possible to use the minimum exciting-current value needed to keep solenoid-actuated directional control valve 6 at its fully-closed position during the normal power-assist control mode, thereby reliably continuously maintaining directional control valve 6 at the fully-closed position while effectively suppressing or reducing electric power consumption.

(6) When ignition switch 33 is turned ON, the motor control circuit of ECU 30 controls motor 1 in such a manner as to rise the pressure differential between hydraulic pressure P in the communicating circuit (12, 13) and hydraulic pressure in drain line 14 up to a pressure value higher than or equal to the predetermined value substantially corresponding to predetermined hydraulic pressure value $P_0$. Under the condition where the pressure differential has been risen up to the pressure value higher than or equal to the predetermined value substantially corresponding to predetermined hydraulic pressure value $P_0$ after ignition switch 33 has been turned ON, the solenoid-actuated directional control valve control circuit of ECU 30 controls or adjusts the exciting current applied to the solenoid (coil 55) of directional control valve 6 to relatively low exciting current B in the normal power-assist control mode. Thus, it is possible to hold solenoid-actuated directional control valve 6 at its fully-closed position by way of a relatively small magnitude of attracting force Fs created by application of relatively low exciting current B to the solenoid by adjusting the pressure differential between hydraulic pressure P in the communicating circuit (12, 13) and hydraulic pressure in drain line 14 at a pressure value higher than or equal to the predetermined value substantially corresponding to predetermined hydraulic pressure value $P_0$ after ignition switch 33 has been turned ON. Thus, it is possible to efficiently simply control the exciting current applied to the solenoid of directional control valve 6 by only switching operation between the first and second current values A and B, without using complicated duty-cycle control or complicated pulse-width modulation of energization (on duty)/de-energization (off duty) of the solenoid valve. The normal power-assist control mode means the normal power steering mode executed in absence of a power steering system failure, such as a motor failure, a reversible pump failure, or a signal line failure.

(7) The solenoid-actuated directional control valve control circuit of ECU 30 includes a timer (internal timer 30a) needed to execute the working-fluid leakage check processing for estimation of the degree of a drop in the pressure differential between hydraulic pressure P in the communicating circuit (12, 13) and hydraulic pressure in drain line 14. Reaching the count value of internal timer 30a to predetermined threshold value $T_1$ means that the pressure differential approaches close to the predetermined value substantially corresponding to predetermined hydraulic pressure value $P_0$. Thus, solenoid-actuated directional control valve 6 is energized by application of relatively high exciting current A to the solenoid every predetermined time intervals $T_1$. Thus, it is possible to certainly maintain directional control valve 6 at its fully-closed position by switching from relatively low exciting current B to relatively high exciting current A before the pressure differential between hydraulic pressure P in the communicating circuit (12, 13) and hydraulic pressure in drain line 14 (or reservoir 5) reduces to below the predetermined value substantially corresponding to predetermined hydraulic pressure value $P_0$. due to leakage of working fluid from directional control valve 6 to drain port 62.

The entire contents of Japanese Patent Application No. 2004-063289 (filed Mar. 8, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic power steering system comprising:
a steering mechanism adapted to be connected to steered road wheels;
a hydraulic power cylinder accommodating therein a piston connected to the steering mechanism for steering assistance, and having first and second hydraulic chambers defined on both sides of the piston;
a reversible pump having a pair of discharge ports;
a first fluid line intercommunicating the first hydraulic chamber and a first one of the discharge ports of the pump;
a second fluid line intercommunicating the second hydraulic chamber and the second discharge port;
a torque sensor that detects a steering torque applied to the steering mechanism;
a motor that drives the pump;
a motor control circuit that controls the motor responsively to a command signal determined based on the steering torque detected;
a reservoir storing working fluid;
a first communicating line intercommunicating the first fluid line and the reservoir;
a second communicating line intercommunicating the second fluid line and the reservoir;
a first one-way directional control valve disposed in the first communicating line for permitting only a working-fluid flow from the first fluid line to the reservoir;
a second one-way directional control valve disposed in the second communicating line for permitting only a working-fluid flow from the second fluid line to the reservoir;
a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves irrespective of the solenoid energized state or the solenoid de-energized state when a pressure differential between a hydraulic pressure in the communicating line between either one of the first and second one-way directional control valves and the solenoid-actuated directional control valve and a hydraulic pressure in the reservoir is greater than or equal to a predetermined value; and a solenoid-actuated directional control valve control circuit that establishes fluid communication between the reservoir and each of the first and second one-way directional control valves by opening the directional control valve in the presence of a hydraulic power steering system failure, including at least one of a motor failure, a reversible pump failure, an ECU failure, and a torque sensor failure, the solenoid-actuated directional control valve control circuit applying a relatively low exciting current to a solenoid of the directional control valve when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

2. The hydraulic power steering system as claimed in claim 1, wherein:
the first and second communicating lines are joined to each other upstream of the reservoir; and
the solenoid-actuated directional control valve comprises a normally-open, single solenoid-actuated directional control valve disposed between the reservoir and the joined portion of the first and second communicating lines.

3. The hydraulic power steering system as claimed in claim 1, wherein:
the solenoid-actuated directional control valve comprises:
(a) a poppet valve mechanism; and
(b) an electromagnetic solenoid unit including an armature linked to the poppet valve mechanism and a coil that varies an axial position of the armature by switching between the solenoid de-energized state and the solenoid energized state.

4. The hydraulic power steering system as claimed in claim 1, wherein:
the solenoid-actuated directional control valve control circuit estimates, based on a motor current value of electric current flowing through the motor, the hydraulic pressure in the communicating line.

5. The hydraulic power steering system as claimed in claim 1, wherein:
the solenoid-actuated directional control valve control circuit comprises a feedback circuit that feedback-controls the hydraulic pressure in the communicating line, so that the pressure differential is brought closer to a desired value higher than or equal to the predetermined value substantially corresponding to the predetermined pressure value.

6. The hydraulic power steering system as claimed in claim 1, wherein:
the motor control circuit controls the motor to rise the pressure differential up to a desired value higher than or equal to the predetermined value substantially corresponding to the predetermined pressure value after switching to a turned-ON state of an ignition switch; and
the solenoid-actuated directional control valve control circuit adjusts the exciting current applied to the solenoid to the relatively low exciting current under a condition where the pressure differential has been risen up to the desired value higher than or equal to the predetermined value substantially corresponding to the predetermined pressure value during a normal power-assist control mode.

7. The hydraulic power steering system as claimed in claim 1, wherein:
the solenoid-actuated directional control valve control circuit comprises a timer that switches the exciting current applied to the solenoid from the relatively low exciting current to the relatively high exciting current every predetermined time intervals during a normal power-assist control mode.

8. A hydraulic power steering system comprising:
a steering mechanism adapted to be connected to steered road wheels;
a hydraulic power cylinder accommodating therein a piston connected to the steering mechanism for steering assistance, and having first and second hydraulic chambers defined on both sides of the piston;
a reversible pump having a pair of discharge ports;
a first fluid line intercommunicating the first hydraulic chamber and a first one of the discharge ports of the pump;
a second fluid line intercommunicating the second hydraulic chamber and the second discharge port;
a motor that drives the pump;
a motor control circuit that controls the motor;
a reservoir storing working fluid;
a first communicating line intercommunicating the first fluid line and the reservoir;
a second communicating line intercommunicating the second fluid line and the reservoir;
a first one-way directional control valve disposed in the first communicating line for permitting only a working-fluid flow from the first fluid line to the reservoir;
a second one-way directional control valve disposed in the second communicating line for permitting only a working-fluid flow from the second fluid line to the reservoir;
a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves when a pressure differential between a hydraulic pressure in the communicating line between either one of the first and second one-way directional control valves and the solenoid-actuated directional control valve and a hydraulic pressure in the reservoir is greater than or equal to a predetermined value; and a solenoid-actuated directional control valve control circuit that establishes fluid communication between the reservoir and each of the first and second one-way directional control valves by opening the directional control valve in the presence of a hydraulic power steering system failure, including at least one of a motor failure and a reversible pump failure, the solenoid-actuated directional control valve control circuit applying a relatively low exciting current to a solenoid of the directional control valve when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

9. The hydraulic power steering system as claimed in claim 8, wherein:

the first and second communicating lines are joined to each other upstream of the reservoir; and the solenoid-actuated directional control valve comprises a normally-open, single solenoid-actuated directional control valve disposed between the reservoir and the joined portion of the first and second communicating lines.

10. The hydraulic power steering system as claimed in claim 8, wherein:

the solenoid-actuated directional control valve comprises:
(a) a poppet valve mechanism; and
(b) an electromagnetic solenoid unit including an armature linked to the poppet valve mechanism and a coil that varies an axial position of the armature by switching between the solenoid de-energized state and the solenoid energized state.

11. The hydraulic power steering system as claimed in claim 8, wherein:

the solenoid-actuated directional control valve control circuit estimates, based on a motor current value of electric current flowing through the motor, the hydraulic pressure in the communicating line.

12. The hydraulic power steering system as claimed in claim 8, wherein:

the solenoid-actuated directional control valve control circuit comprises a feedback circuit that feedback-controls the hydraulic pressure in the communicating line, so that the pressure differential is brought closer to a desired value higher than or equal to the predetermined value substantially corresponding to the predetermined pressure value.

13. The hydraulic power steering system as claimed in claim 8, wherein:

the motor control circuit controls the motor to rise the pressure differential up to a desired value higher than or equal to the predetermined value substantially corresponding to the predetermined pressure value after switching to a turned-ON state of an ignition switch; and the solenoid-actuated directional control valve control circuit adjusts the exciting current applied to the solenoid to the relatively low exciting current under a condition where the pressure differential has been risen up to the desired value higher than or equal to the predetermined value substantially corresponding to the predetermined pressure value during a normal power-assist control mode.

14. The hydraulic power steering system as claimed in claim 8, wherein:

the solenoid-actuated directional control valve control circuit comprises a timer that switches the exciting current applied to the solenoid from the relatively low exciting current to the relatively high exciting current every predetermined time intervals during a normal power-assist control mode.

15. A hydraulic power steering system comprising:

a steering mechanism adapted to be connected to steered road wheels;

a hydraulic power cylinder accommodating therein a piston connected to the steering mechanism for steering assistance, and having first and second hydraulic chambers defined on both sides of the piston;

a reversible pump having a pair of discharge ports;

a first fluid line intercommunicating the first hydraulic chamber and a first one of the discharge ports of the pump;

a second fluid line intercommunicating the second hydraulic chamber and the second discharge port;

a motor that drives the pump;

a motor control circuit that controls the motor;

a reservoir storing working fluid;

a first communicating line intercommunicating the first fluid line and the reservoir;

a second communicating line intercommunicating the second fluid line and the reservoir;

a first one-way directional control valve disposed in the first communicating line for permitting only a working-fluid flow from the first fluid line to the reservoir;

a second one-way directional control valve disposed in the second communicating line for permitting only a working-fluid flow from the second fluid line to the reservoir;

a solenoid-actuated directional control valve disposed between the first one-way directional control valve and the reservoir and between the second one-way directional control valve and the reservoir, for blocking fluid communication between the reservoir and each of the first and second one-way directional control valves in a solenoid energized state and for establishing fluid communication between the reservoir and each of the first and second one-way directional control valves in a solenoid de-energized state, the solenoid-actuated directional control valve blocking fluid communication between the reservoir and each of the first and second one-way directional control valves when a pressure differential between a hydraulic pressure in the communicating line between either one of the first and second one-way directional control valves and the solenoid-actuated directional control valve and a hydraulic pressure in the reservoir is greater than or equal to a predetermined value; and a solenoid-actuated directional control valve control circuit that de-energizes a solenoid of the directional control valve in the presence of a hydraulic power steering system failure, including at least one of a motor failure and a reversible pump failure, the solenoid-actuated directional control valve control circuit applying a relatively low exciting current to the solenoid when the hydraulic pressure in the communicating line exceeds a predetermined pressure value, and the solenoid-actuated directional control valve control circuit applying a relatively high exciting current having a higher current value than the relatively low exciting current to the solenoid when the hydraulic pressure in the communicating line is less than or equal to the predetermined pressure value.

16. A hydraulic power steering system comprising:

a steering mechanism adapted to be connected to steered road wheels;

a hydraulic power cylinder accommodating therein a piston connected to the steering mechanism for steering assistance, and having first and second hydraulic chambers defined on both sides of the piston;

a reversible pump having a pair of discharge ports;

a first fluid line intercommunicating the first hydraulic chamber and a first one of the discharge ports of the pump;

a second fluid line intercommunicating the second hydraulic chamber and the second discharge port;

sensor means for detecting a steering torque applied to the steering mechanism;

a motor that drives the pump;

motor control means for controlling the motor responsively to a command signal determined based on the steering torque detected;

a reservoir storing working fluid;

a first communicating line intercommunicating the first fluid line and the reservoir;

a second communicating line intercommunicating the second fluid line and the reservoir;

a first one-way directional control valve disposed in the first communicating line for permitting only a working-fluid flow from the first fluid line to the reservoir;

a second one-way directional control valve disposed in the second communicating line for permitting only a working-fluid flow from the second fluid line to the reservoir;

solenoid-actuated directional control valve means, which is disposed between the first one-way directional control valve and the reservoir and between the second one-way directional control valve and the reservoir for blocking fluid communication between the reservoir and each of the first and second one-way directional control valves in a solenoid energized state and for establishing fluid communication between the reservoir and each of the first and second one-way directional control valves in a solenoid de-energized state, and whose valve opening varies based on a solenoid attracting force created by a solenoid of the directional control valve means and a pressure differential between a hydraulic pressure in the communicating line between either one of the first and second one-way directional control valves and the solenoid-actuated directional control valve and a hydraulic pressure in the reservoir;

said solenoid-actuated directional control valve means blocking fluid communication between the reservoir and each of the first and second one-way directional control valves irrespective of the solenoid energized state or the solenoid de-energized state when the pressure differential is greater than or equal to a predetermined value; and valve control means electrically connected to the solenoid-actuated directional control valve means for establishing fluid communication between the reservoir and each of the first and second one-way directional control valves by opening the directional control valve means in the presence of a hydraulic power steering system failure, including at least one of a motor failure and a reversible pump failure, and for blocking fluid communication between the reservoir and each of the first and second one-way directional control valves by closing the directional control valve means in absence of the hydraulic power steering system failure, the valve control means applying a relatively low exciting current to the solenoid for holding the directional control valve means at a predetermined closed position when the hydraulic pressure in the communicating line exceeds a predetermined pressure value, and the valve control means applying a relatively high exciting current having a higher current value than the relatively low exciting current to the solenoid for holding the directional control valve means at the predetermined closed position when the hydraulic pressure in the communicating line is less than or equal to the predetermined pressure value.

17. The hydraulic power steering system as claimed in claim 16, wherein:

the directional control valve means comprises a poppet valve mechanism, the poppet valve mechanism having a drain port communicating the reservoir, a first communication port connected to an outlet port of the first one-way directional control valve, and a second communication port connected to an outlet port of the second one-way directional control valve; and the valve control means holds the poppet valve mechanism unseated and opened in the presence of the hydraulic power steering system failure, for establishing fluid communication between the reservoir and each of the first and second one-way directional control valves by relieving the hydraulic pressure, charged in the communicating line between either one of the first and second one-way directional control valves and the poppet valve mechanism, via the drain port to the reservoir.

18. The hydraulic power steering system as claimed in claim 17, wherein:

the valve control means holds the poppet valve mechanism seated and closed in the absence of the hydraulic power steering system failure, for blocking fluid communication between the reservoir and each of the first and second one-way directional control valves by holding the hydraulic pressure, charged in the communicating line between either one of the first and second one-way directional control valves and the poppet valve mechanism, at a pressure value substantially corresponding to a pressure level of working fluid in the first and second fluid lines.

19. The hydraulic power steering system as claimed in claim 18, wherein:

the poppet valve mechanism has a double poppet valve structure, the double poppet valve structure comprising:

a valve housing having an axial bore, the drain port and the first and second communication ports;

a first spring-offset solenoid-actuated poppet slidably disposed in the axial bore;

an axial movement of the first poppet being determined based on a summed force of the solenoid attracting force and a first return spring reaction force; and a second poppet slidably disposed in the axial bore and axially aligned with the first poppet, and formed at a first axial end with a first poppet valve seat on which the first poppet seats and a pressure-receiving portion to which the hydraulic pressure, charged in the communicating line between either one of the first and second one-way directional control valves and the poppet valve mechanism, is applied, and formed at the second axial end with a second poppet valve portion; an axial movement of the second poppet being determined based on a summed force of an axial force applied from the first poppet to the second poppet, a pressure force acting on the second poppet by the pressure differential, and a second return spring reaction force.

20. A method for controlling a hydraulic power steering system, wherein the hydraulic power steering system includes a hydraulic power cylinder accommodating therein a piston connected to a steering mechanism for steering assistance and having first and second hydraulic chambers defined on both sides of the piston, a reversible pump driven by a motor, a first fluid line intercommunicating the first hydraulic chamber and a first one of two discharge ports of the pump, a second fluid line intercommunicating the second hydraulic chamber and the second discharge port, a torque sensor that detects a steering torque applied to the steering mechanism, a reservoir, a first communicating line intercommunicating the first fluid line and the reservoir, a second communicating line intercommunicating the second fluid line and the reservoir, a first one-way check valve disposed in the first communicating line for permitting only a working-fluid flow from the first fluid line to the reservoir, a second one-way check valve disposed in the second communicating line for permitting only a working-fluid flow from the second fluid line to the reservoir, a solenoid-actuated directional control valve whose opening varies based on a solenoid attracting force created by a solenoid of the directional control valve and a pressure differential between a hydraulic pressure in the communicating line between either one of the first and second one-way check valves and the solenoid-actuated directional control valve and a hydraulic pressure in the reservoir and which is disposed between the first one-way check valve and the reservoir and between the second one-way check valve and the reservoir, and an electronic control unit configured to be electronically connected to the torque sensor, the motor and the solenoid-actuated directional control valve, for automatically controlling a state of steering assistance and for fail-safe purposes of the hydraulic power steering system, the method comprising:

(a) controlling the motor responsively to a command signal determined based on the steering torque detected;

(b) blocking fluid communication between the reservoir (5) and each of the first and second one-way check valves by closing the solenoid-actuated directional control valve in a solenoid energized state during a normal power-assist control mode;

(c) establishing fluid communication between the reservoir and each of the first and second one-way check valves by opening the solenoid-actuated directional control valve in a solenoid de-energized state during a manual steering mode;

(d) blocking fluid communication between the reservoir and each of the first and second one-way check valves by closing the solenoid-actuated directional control valve irrespective of the solenoid energized state or the solenoid de-energized state when a pressure differential between a hydraulic pressure in the communicating line between either one of the first and second one-way check valves and the solenoid-actuated directional control valve and a hydraulic pressure in the reservoir is greater than or equal to a predetermined value;

(e) establishing fluid communication between the reservoir and each of the first and second one-way check valves by opening the directional control valve to initiate the manual steering mode in the presence of a hydraulic power steering system failure including at least one of a motor failure and a reversible pump failure;

(f) applying a relatively low exciting current to the solenoid for holding the directional control valve at a predetermined closed position when the hydraulic pressure in the communicating line exceeds a predetermined pressure value during the normal power-assist control mode; and (g) applying a relatively high exciting current having a higher current value than the relatively low exciting current to the solenoid for holding the directional control valve at the predetermined closed position when the hydraulic pressure in the communicating line is less than or equal to the predetermined pressure value during the normal power-assist control mode.

21. The method as claimed in claim 20, further comprising:

estimating, based on a motor current value of electric current flowing through the motor, the hydraulic pressure in the communicating line.

22. The method as claimed in claim 21, further comprising:

feedback-controlling the hydraulic pressure in the communicating line, so that the pressure differential is brought closer to a desired value higher than or equal to the predetermined value substantially corresponding to the predetermined pressure value.

23. The method as claimed in claim 22, further comprising:

switching the exciting current applied to the solenoid from the relatively low exciting current to the relatively high exciting current every predetermined time intervals during the normal power-assist control mode.

* * * * *